(12) United States Patent
Kim et al.

(10) Patent No.: US 8,133,088 B2
(45) Date of Patent: Mar. 13, 2012

(54) FILAMENT FOR INFRARED LAMP AND METHOD OF MANUFACTURING THE SAME

(75) Inventors: Yong Sun Kim, Suwon (KR); Young Nam Kim, Ansan (KR); Kyong Hoon Park, Suwon (KR); Joeng Yeob Yun, Ansan (KR)

(73) Assignee: Lichtzen Co., Ltd., Ansan (KR)

( * ) Notice: Subject to any disclaimer, the term of this patent is extended or adjusted under 35 U.S.C. 154(b) by 0 days.

(21) Appl. No.: 12/918,700

(22) PCT Filed: Dec. 22, 2009

(86) PCT No.: PCT/KR2009/007689
§ 371 (c)(1),
(2), (4) Date: Aug. 20, 2010

(87) PCT Pub. No.: WO2010/082731
PCT Pub. Date: Jul. 22, 2010

(65) Prior Publication Data
US 2011/0266948 A1    Nov. 3, 2011

(30) Foreign Application Priority Data

Jan. 16, 2009  (KR) .......................... 10-2009-0003684

(51) Int. Cl.
*H01J 9/00* (2006.01)
(52) U.S. Cl. .......................................... 445/27; 313/315
(58) Field of Classification Search .......... 313/315–316; 445/27, 32
See application file for complete search history.

(56) References Cited

U.S. PATENT DOCUMENTS

| | | | |
|---|---|---|---|
| 6,057,532 A | 5/2000 | Dexter et al. | |
| 6,654,549 B1 | 11/2003 | Konishi | |
| 6,922,017 B2 | 7/2005 | Konishi et al. | |
| 6,943,362 B2 | 9/2005 | Linow | |
| 7,212,735 B2 | 5/2007 | Konishi | |
| 2001/0055478 A1 | 12/2001 | Scherzer et al. | |
| 2006/0115244 A1 | 6/2006 | Linow et al. | |

FOREIGN PATENT DOCUMENTS

| | | |
|---|---|---|
| JP | 05-170537 | 7/1993 |
| JP | 06-349568 | 12/1994 |
| JP | 2000-299178 | 10/2000 |
| JP | 2002-015842 | 1/2002 |
| KR | 10-0657469 | 12/2006 |

*Primary Examiner* — Nimeshkumar Patel
*Assistant Examiner* — Donald Raleigh
(74) *Attorney, Agent, or Firm* — Rabin & Berdo, P.C.

(57) ABSTRACT

The present invention relates to a filament for an infrared lamp used as a heater and a method of manufacturing the same. The method of fabricating the filament includes cutting a thin graphite plate into a thin graphite plate strip of a predetermined size, integrally adhering two sheets of the thin graphite plate strips using heat, primarily heating and plasticizing the integrally adhered graphite plate strips within an inert gas, coating a silicon-series coating solution on the primarily heated and plasticized graphite plate strips and naturally drying the graphite plate strips, and heating and plasticizing the naturally dried graphite plate strips using an identical process to the primary plasticity process and then naturally cooling the heated and plasticized graphite plate strips.

10 Claims, 4 Drawing Sheets

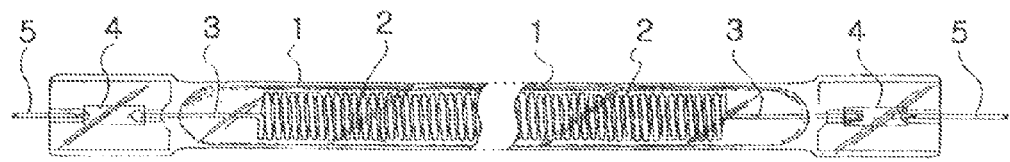
[Fig. 1]
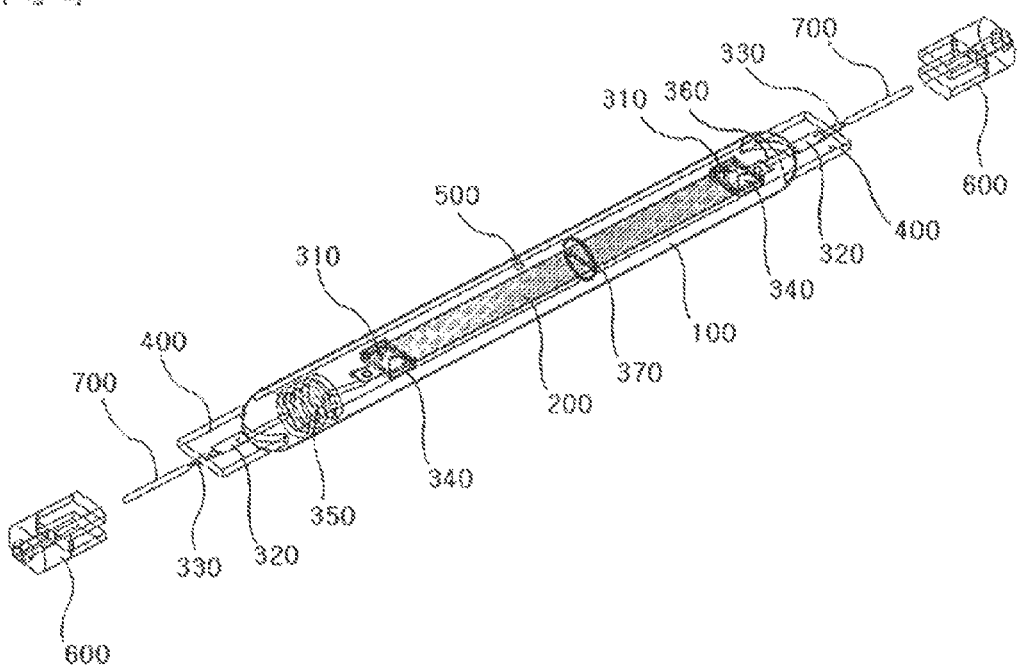
[Fig. 2]
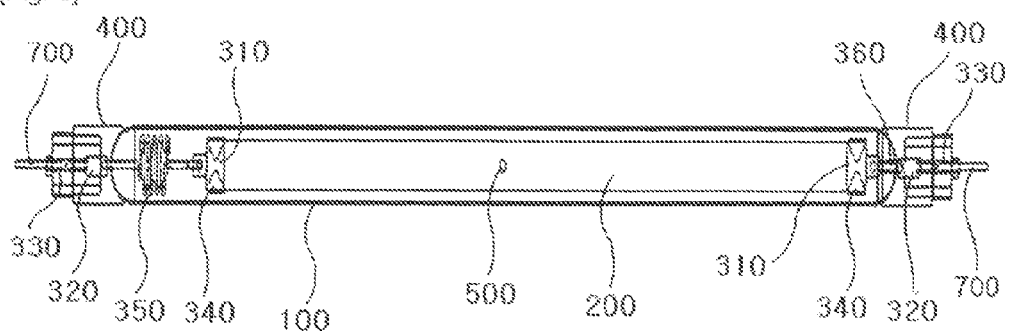
[Fig. 3]

[Fig. 4]
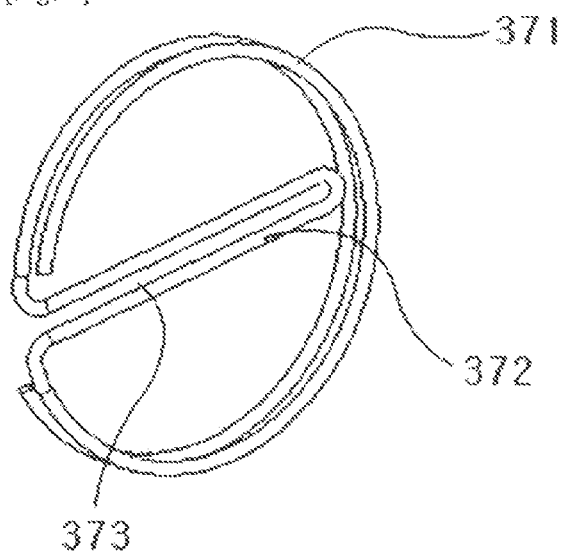
[Fig. 5]
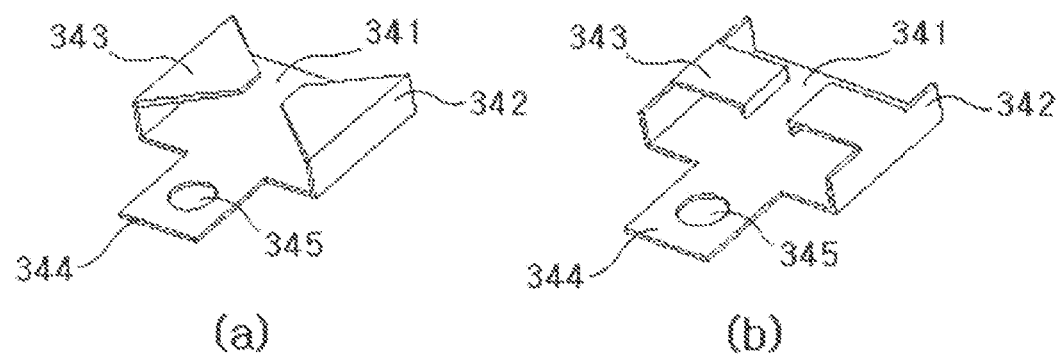

[Fig. 6]
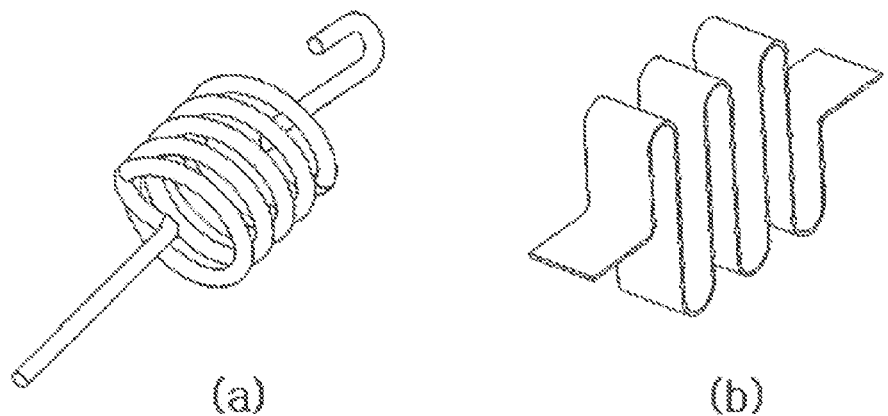
(a) (b)
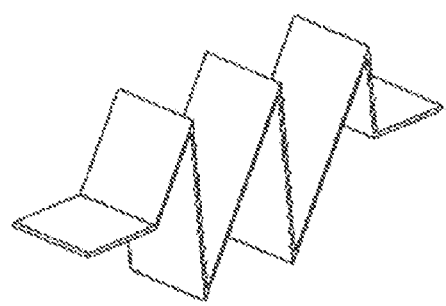
(c)
[Fig. 7]
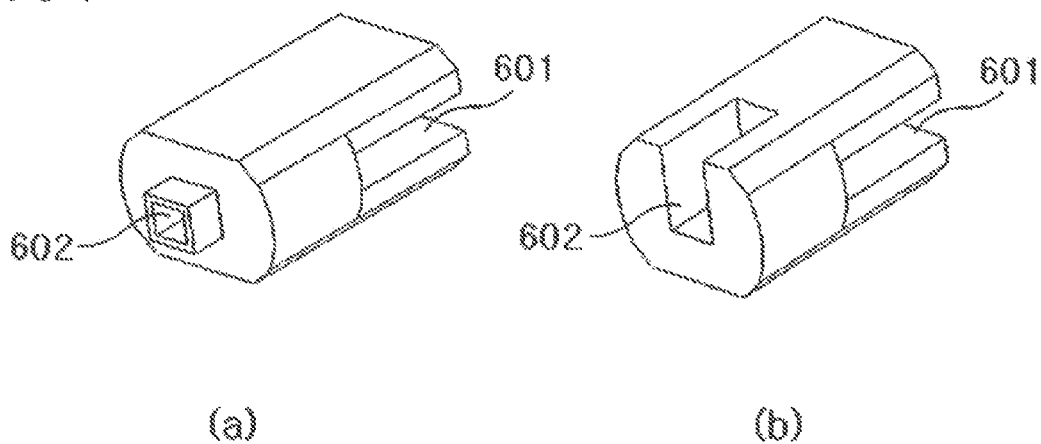
(a) (b)

[Fig. 8]
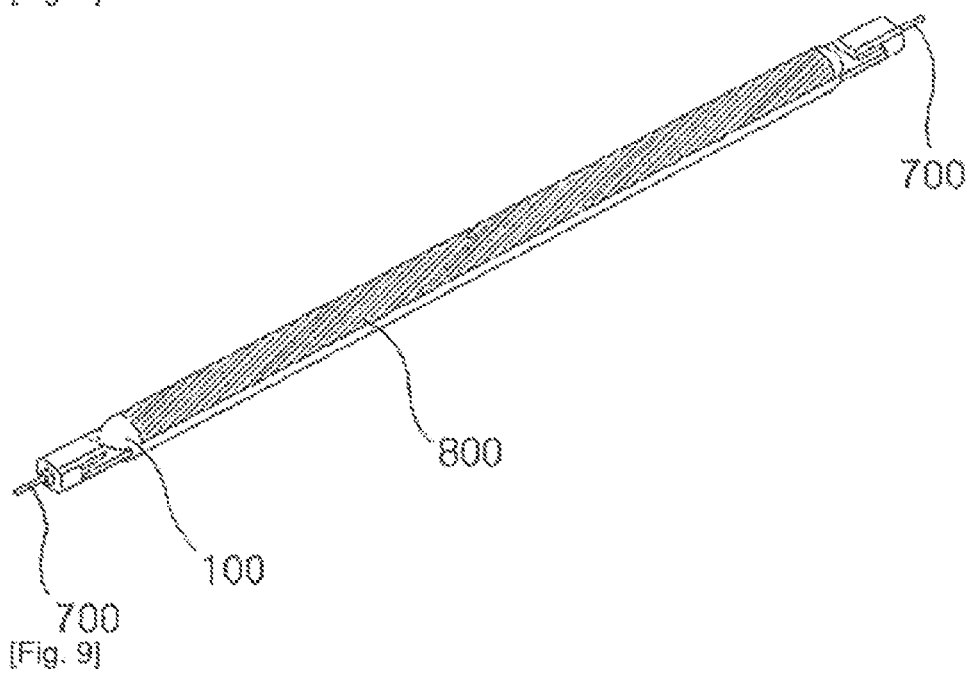
[Fig. 9]
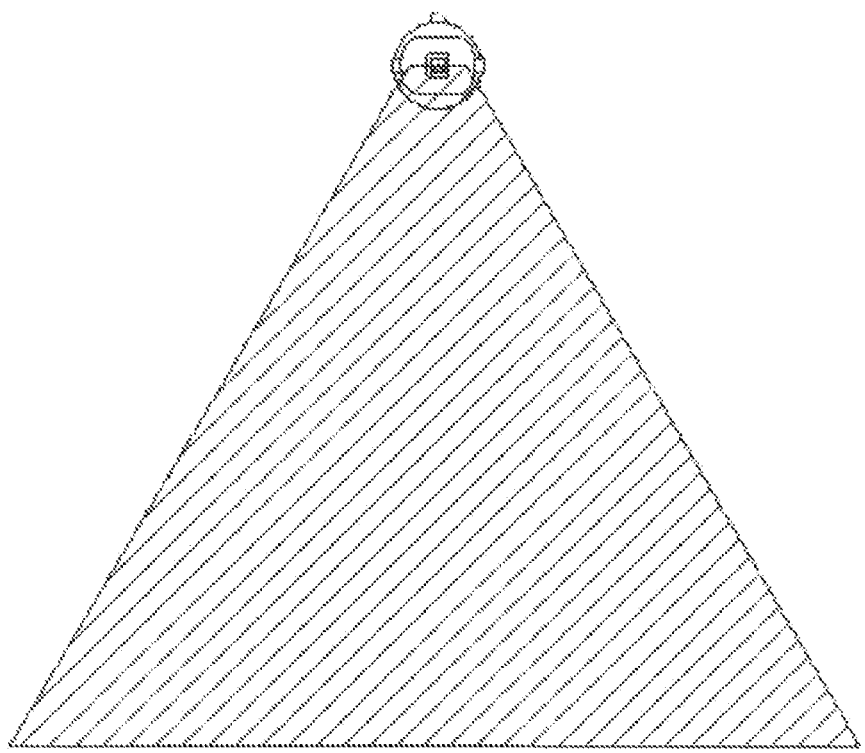

FILAMENT FOR INFRARED LAMP AND METHOD OF MANUFACTURING THE SAME

BACKGROUND OF THE INVENTION

1. Field of the Invention

The present invention relates to a filament for an infrared lamp used as a heater, such as a dry chamber for industry and a method of manufacturing the same, and more particularly, to a filament for an infrared lamp having excellent infrared radiation efficiency, electrical performance, and durability using a thin graphite plate and a method of manufacturing the same.

2. Background of the Related Art

An infrared lamp operated by a common power source is being widely used as heating apparatuses, such as a dry chamber for industry, a heater for home use, and a cooker. FIG. 1 is an exemplary diagram of a conventional infrared lamp.

As shown, an internal lead wire 3 on both ends of a filament 2 is connected to relay pieces 4 formed of a thin metal plate. Next, the other ends of the relay pieces 4 are connected to external lead wires 5. Furthermore, the filament 2 is inserted into a transparent quartz tube 1 into which an inert gas is injected. Both ends of the quartz tube 1 are pinch-sealed. When a power source is supplied to the external lead wires 5, infrared rays are radiated in all directions from the filament 2 within the quartz tube 1.

The filament of the infrared lamp is chiefly made of carbon. The carbon-material filament includes several types, such as a carbon sponge filament of a bar shape, a carbon sintering filament of a strip shape, and a spiral carbon strip filament formed by twisting several strings of carbon threads to form a strip shape and then forming the strip shape into a spiral shape.

Meanwhile, the conventional filament made of carbon has the following problems. First, the bar-shaped carbon sponge filament is problematic in that it is very difficult to meet a desired resistance value according to the resistance characteristic of carbon itself and that infrared rays are not uniformly radiated because the density of the sponge is not uniform and thus current does not flow into some portions of the sponge. Further, the bar-shaped carbon sponge filament is problematic in that the lifespan is short because of a difference in the temperature between the surface and the central portion of the filament because it has the bar shape.

In the strip-shaped carbon sintering filament, the filament is stretched when light is emitted, and curve or deformation is generated because of a thin and wide width. Furthermore, if the width is 10 mm or more, there are problems in that a plastic task is difficult and strength is weak. If the length is 500 mm or more, there is a problem in that the filament is difficult to fabricate. For the above reasons, a long lamp is fabricated by connecting two or more short filaments using a middle medium. However, the long lamp is problematic in that the filament is likely to be broken, a special adhesive for adhering the middle medium to the filament has to be used, and the radiation of infrared rays is not uniform because the middle medium does not emit light.

In the spiral carbon strip filament, when light is emitted, the length of the filament is stretched and the filament is bent. Consequently, the filament reaches the wall of the quartz tube, thereby contaminating the quartz tube. In worse cases, the quartz tube is damaged. Furthermore, the inside of the filament is hollowed out, and a gap is formed between the filaments. Accordingly, since concentrated energy is not efficiently used, the surface area of the filament versus emission efficiency is low and thus power consumption is high.

Furthermore, if the length of the filament is increased, pressurization is irregular when molding is performed, and deformation is likely to occur when plasticity is performed. Further, if the gap between the filaments is not regular, temperature differs according to the location of the filament and thus energy efficiency is low. Moreover, since it is difficult to place the filament at the internal center of the quartz tube, an elaborate and experienced task is required, thereby making it difficult to increase productivity.

As described above, the conventional carbon-material filament is problematic in that the radiation efficiency of infrared rays is low, radiation is not regular, power consumption is great, the lifespan is short, manufacture is difficult, and productivity is low.

SUMMARY OF THE INVENTION

Accordingly, the present invention has been made in view of the above problems occurring in the prior art, and it is an object of the present invention to provide a filament for an infrared lamp with a regular radiation of infrared rays, a high radiation efficiency, a high heatproof property and durability, low power consumption, easy manufacture, and high productivity and a method of manufacturing the same.

To achieve the above object, the filament for an infrared lamp is fabricated by coating a special silicon-series coating solution on a thin graphite plate.

Furthermore, in accordance with the present invention, a centering coil is configured to support the filament, and the structure of an insulator is improved so that an external lead wire can be drawn out in a horizontal or vertical direction as occasion demands. Further, a reflector is formed on a surface of a quartz tube in order to downwardly reflect upwardly radiated infrared rays.

BRIEF DESCRIPTION OF THE DRAWINGS

Further objects and advantages of the invention can be more fully understood from the following detailed description taken in conjunction with the accompanying drawings in which:

FIG. 1 is an exemplary diagram of a conventional infrared lamp;

FIG. 2 shows the entire structure of an infrared lamp according to an embodiment of the present invention;

FIG. 3 is a plan view of the infrared lamp according to the embodiment of the present invention;

FIG. 4 shows the structure of a centering coil;

FIG. 5 shows the structures of fixed clips;

FIG. 6 shows the structures of springs;

FIG. 7 shows the structures of insulators;

FIG. 8 is a diagram showing the filament on which reflector is coated; and

FIG. 9 is a diagram showing a radiation angle of the infrared lamp adopting the filament of FIG. 8.

DESCRIPTION OF REFERENCE NUMERALS OF
PRINCIPAL ELEMENTS IN THE DRAWINGS

| 1:   | quartz tube        | 2:   | filament    |
|------|--------------------|------|-------------|
| 3:   | internal lead wire | 4:   | relay piece |
| 5:   | external lead wire | 100: | quartz tube |
| 200: | filament           | 310: | gasket      |
| 320: | relay piece        | 330: | hair pin    |

-continued

| 340: | fixed clip | 350: | spring |
|---|---|---|---|
| 360: | connection pin | 370: | centering coil |
| 400: | pinch unit | 500: | injection hole |
| 600: | insulator | 700: | external lead wire |
| 800: | reflector | | |

DETAILED DESCRIPTION OF EMBODIMENTS

Some exemplary embodiments of the present invention will now be described in detail with reference to the accompanying drawings.

In accordance with the present invention, a filament for an infrared lamp is fabricated by cutting a thin graphite plate into a thin graphite plate strip of a predetermined size, integrally adhering two sheets of the thin graphite plate strips using heat, primarily heating and plasticizing the integrally adhered graphite plate strips within an inert gas, coating a silicon-series coating solution on the primarily heated and plasticized graphite plate strips and naturally drying the graphite plate strips, and heating and plasticizing the naturally dried graphite plate strips using an identical process to the primary plasticity process and then naturally cooling the heated and plasticized graphite plate strips.

In accordance with the present invention, the filament for an infrared lamp is fabricated by coating a special silicon-series coating solution on a thin graphite plate. The graphite is used for various purposes because it has special physical properties. Further, unlike other materials, the strength of the graphite is increased even though the graphite is heated up to 2500° C., and the size of the graphite is rarely changed even though temperature is greatly changed.

Furthermore, the graphite is one of the materials which are most chemically stabilized. The graphite has excellent tolerance against most acids and alkali chemicals other than a strong oxidization catalyst, such as a mixture of a phosphoric acid and potassium dichromate. Furthermore, the graphite has a very high ratio of weight versus strength and very easy fine processing and can also remove impurities through high purity processing. In general, an inorganic material, such as an insulating material or graphite, has excellent electrical conductivity.

The above-described graphite has characteristics appropriate for the material of a filament, but also has inappropriate characteristics. That is, the graphite starts being oxidized at a temperature of 350° C. in the atmosphere or activation atmosphere. In case where the graphite is used in a high temperature process, a vacuum state must be maintained in order to inhibit the oxidization. Meanwhile, if a silicon-series material is coated on the surface of the graphite, physical characteristics, such as oxidization resistance and abrasion resistance, are greatly improved.

In accordance with the present invention, the filament having a regular radiation of infrared rays, high radiation efficiency, high heatproof and durability properties, low power consumption, easy manufacture, and high productivity is fabricated by making well use of the characteristics of the above-described graphite. Hereinafter, the present invention is described in detail. First, the manufacture of a special silicon-series coating solution to be coated on the filament is described.

(1) An acetic acid (CH3COOH) of 2 wt % and water (H20) of 28 wt % are mixed in a methyltrimethoxysilane (CH3Si(OCH33)) solution of 70 wt % so that a hydrolysis reaction is generated. Here, the hydrolysis reaction is sufficiently generated using a stirrer, etc. and a chemical compound A is created by the reaction.

(2) Aluminum silicate and graphite powder are mixed in a ratio of 8:2, thereby creating a mixture B.

(3) A silicon solution which is 1.66 times greater than the created mixture B is mixed in the mixture B, thereby creating a new mixture C.

(4) Next, the chemical compound A of 25 wt % (4:1) of the mixture C is mixed in the mixture C, thereby creating the special silicon-series coating solution.

The created special silicon-series coating solution has almost the same color as graphite. If the special silicon-series coating solution is coated on a filament, radiation efficiency is increased because infrared rays have high transmissivity when light is emitted, the durability of the filament is increased, and the sagging of the filament resulting from thermal expansion is prevented.

Furthermore, if the silicon-series components are used to fabricate a filament, strong infrared radiation energy is emitted in an infrared wavelength band (In general, 2 to 5 µm) from the infrared region. The infrared radiation energy has a wavelength band which is most suitable to dry coated metal- or nonmetal-series products. In particular, the infrared radiation energy has an excellent dry effect in water-based paint, polymer resin, glass, paint, ink, and moisture. Further, the infrared radiation energy has an excellent permeation property as compared with the conventional carbon-series or bar-shaped heater and lamp. The infrared radiation energy is excellent in terms of the dry time because the lighting-up speed of a lamp is only 1 to 2 seconds and so the response speed is fast.

The manufacture of the filament according to the present invention is described below.

A thin graphite plate is cut to have a width of about 10 to 15 mm and a predetermined length with consideration taken of a lamp output. For example, if a rated input voltage is 110 VAC and a lamp output is 2.1 KW, the thin graphite plate can be cut to have a width of about 13 mm and a length of 720 mm. If the lamp output is 1 KW, the thin graphite plate can be cut to have a width of about 13 mm and a length of 370 mm.

Two sheets of the formed thin graphite plate strips are integrally joined together by heat. Only one sheet of the thin graphite plate strip can be used. In this case, however, there are problems in that an electrical characteristic (in particular, a desired resistance value) is difficult to meet, the size of a filament has to be increased, the filament may be cut because of the generation of heat resulting from low durability, the filament may be deformed because of low elasticity, and a horizontal state is difficult to maintain. For the above problems, it is preferred that the filament be fabricated by joining two sheets of the thin graphite plate strips together.

Next, the two sheets of the thin graphite plate strips are plasticized at a temperature of about 1100° C. in an inert gas atmosphere, such as nitrogen or argon gas. A sharp increase in the temperature during the molding and a sharp decrease in the temperature during cooling after the plasticity can generate abnormalities in the thin plate. Accordingly, the temperature should be increased by about 5 to 8° C. every minute when the thin plate is plasticized, and the temperature should be naturally decreased when the thin plate is cooled.

The special silicon-series coating solution is coated on the primarily plastic thin graphite plate strips. The number of the coatings of the coating solution preferably is 2, but may be 1 or several times. The coated thin graphite plate strips are naturally dried and then secondarily heated and plasticized using the same process as the primary plastic process. The thin graphite plate strips are naturally cooled slowly when they are cooled.

The filament of the present invention is fabricated as described above. The filament has a uniform radiation of infrared rays, high radiation efficiency, a high heatproof property, high durability, and low power consumption. Furthermore, if the filament of the present invention is used, a lamp can be easily fabricated.

Hereinafter, the manufacture of an infrared, lamp using the filament of the present invention is described. FIG. 2 shows the entire structure of the infrared lamp according to an embodiment of the present invention. FIG. 3 is a plan view of the infrared lamp according to the embodiment of the present invention. FIG. 4 shows the structure of a centering coil. FIG. 5 shows the structures of fixed clips. FIG. 6 shows the structures of springs. FIG. 7 shows the structures of insulators.

The filament 200 of the present invention fabricated as described above is configured to be protected and to transmit radiated infrared rays to the maximum extent and then placed within a transparent quartz tube 100. After the filament 200 is placed at the internal center of the quartz tube 100, a centering coil 370 is inserted into the center of the filament 200, thereby fixing the filament 200.

As shown FIG. 4, the centering coil 370 has a round ring shape and includes two strings of circumferential portions 371 for securing stability and an insertion portion 372 formed at the center of the centering coil 370 in a horizontal direction. Accordingly, the filament 200 can be inserted into the slot 373 of the insertion portion 372 and fixed thereto.

Because of the above structure of the centering coil 370, although physical impacts, such as the external shaking, laying-down, or standing of the quartz tube 100, are applied to the quartz tube 100, or thermal expansion is generated when light is emitted, the filament 200 is not deviated from the quartz tube 100 and fixed thereto. Furthermore, even though the filament 200 is stretched because of thermal expansion when light is emitted, the filament does not sag downwardly and thus the filament is prevented from adhering to the inner wall of the quartz tube 100. The centering coil 370 is formed of a wire made of molybdenum having an excellent temperature characteristic.

Next, gaskets 310 formed of a soft and thin graphite plate are adhered to the upper and lower portions on both sides of the filament 200. The gaskets 310 are surrounded with respective fixed clips 340 and then compressed thereto. The gasket 310 has the same width as the filament 200 and has a length of about 10 mm and a thickness of about 1 to 2 mm. The gaskets 310 are also fabricated using a plasticity process at the same temperature conditions as those of the filament 200 so that impurities are not drained out when the filament 200 emits rays.

If a contact state of the filament 200 and the gaskets 310 is not good, a contact resistance can be increased and the filament 200 can be damaged because of overcurrent. Accordingly, the filament 200 and the gaskets 310 are fixed by the fixed clips 340 so that the contact state of the filament 200 and the gaskets 310 is good. It is preferred that each of the fixed clips 340 include a support plate 341, lateral plates 342, and upper plates 343 of a sheet shape so that damage to the soft gaskets 310 is prevented and the contact of the filament 200 and the gaskets 310 is increased, as shown FIG. 5. Furthermore, a connection unit 344 for connection to a spring 350 or a connection pin 360 is formed on one side of the support plate 341. The connection unit 344 has a connection hole 345 formed therein.

The connection pin 360 is connected to the connection unit 344 of the fixed clip 340 on one side of the filament 200, and the other end of the connection pin 360 is connected to a relay piece 320. The relay piece 320 is formed of a small-sized thin plate, and the size and material of the relay piece 320 are determined by taking current, voltage, and power flowing into the lamp, into consideration. In an embodiment of the present invention, a thin molybdenum plate having a width of 7 mm, a length of 12 mm, and a thickness of 0.03 mm was used as the relay piece 320.

Meanwhile, the spring 350 is connected to the connection unit 344 of the fixed clip 340 on the other side of the filament 200. The other end of the spring 350 is connected to the relay piece 320. Furthermore, hair pins 330 made of molybdenum are connected to the respective external ends of the relay pieces 320 on both sides. External lead wires 700 are connected to the respective external ends of the hair pins 330. The connection pin 360, the spring 350, and the hair pins 330 are connected to the relay pieces 320 using spot welding.

The above-described spring 350 functions to absorb a minute stretch of the filament 200 due to thermal expansion when light is emitted and should sufficiently bear such stretch even at a high current. Accordingly, the spring 350 is formed by twisting several strings of wires, made of molybdenum having an excellent temperature characteristic, into one string and then forming the one string into a spiral shape. The diameter of the spiral should be almost the same as the internal diameter of the quartz tube 100 in order to minimize a change of the filament 200 when thermal expansion is generated.

The spring 350 chiefly has a spiral structure (refer to FIG. 6A), such as a coil spring, but can have a laminated spring structure, such as that shown in FIG. 6B or FIG. 6C. The thickness and width of the plate are determined by taking current, flowing into the filament 200, into consideration. Furthermore, if the length of the filament 200 is 300 mm or less, the spring 350 needs not to be installed because thermal expansion is small.

The spring 350 has to be designed by sufficiently taking the elasticity of thermal expansion into consideration, and the number of times that the spring 350 is wound should be 2.5 times or more. Furthermore, it is preferred that the above spring 350 be used only one side. If the springs 350 are used on both sides, there is a disadvantage in that the size of a lamp is increased because of an increased length of the quartz tube 100 and the filament 200 can be deformed if thermal expansion is generated in different directions.

The relay pieces 320, the hair pins 330, the fixed. clips 340, the spring 350, the connection pin 360, and the centering coil 370 are made of materials selected by taking internal temperature, etc. into consideration. In the embodiment of the present invention, the molybdenum material is illustrated to be used, but a material, such as tungsten or tantalum, may be used.

After the above connection is completed, both ends of the quartz tube 100 are pinch-sealed using a pinch sealer, thereby forming pinch units 400. Next, an inert gas, such as nitrogen (N) gas, argon (Ar) gas, or a mixed gas of nitrogen (N) and argon (Ar), is injected into the quartz tube 100 through an injection hole 500 at the central portion of the quartz tube 100, and the injection hole 500 is then sealed. The inert gas is injected in order to prevent components within the quartz tube 100 from being oxidized and to increase infrared radiation efficiency.

Finally, for the purpose of insulation in order to prevent a safety accident, insulators 600 shown in FIG. 7 are inserted into the respective pinch units 400 on both sides of the quartz tube 100 and then fixed thereto using a bonding agent, such as gypsum or white cement. The pinch units 400 of the quartz tube 100 are inserted into the respective groove units 601 of the insulator 600 and fixed thereto using an adhesive, and the external lead wires 70 are drawn out to the respective tap units 602.

The insulator 600 of FIG. 7A is disadvantageous in that use can be inconvenient according to circumstances because the external lead wire 700 can be horizontally drawn out, but cannot be vertically drawn out and a total volume is great. Meanwhile, the insulator 600 of FIG. 7B is more preferred because the external lead wire 700 can be drawn out in the horizontal or vertical direction according to circumstances.

FIG. 8 is a diagram showing the filament on which a reflector is coated, and FIG. 9 is a diagram showing a radiation angle of the infrared lamp adopting the filament of FIG. 8. If, as shown FIG. 8, a reflector 800 is formed on a surface of the quartz tube 100, the radiation efficiency of infrared rays can be increased because upwardly radiated infrared rays can be reflected downwardly. The reflector 800 is chiefly formed on half the cylindrical surface of the quartz tube 100. In this case, a radiation angle is about 60 to 75° as shown in FIG. 9.

The reflector 800 is chiefly made of gold (Au) having the most excellent reflection efficiency. With an increase of the thickness of the reflector 800, reflexibility is increased. A golf film having a thickness of about 4 to 5 μm is coated on the surface of the quartz tube 100. In some cases, a high luminance reflection shade may be used instead of the reflector 800 in order to increase the reflection efficiency. If the reflector 800 does not exist, infrared rays of about 40% are radiated upwardly from the lamp. In this case, the radiation efficiency can be decreased, and a structure including the lamp may have an adverse effect.

The following table is the measurement results of power consumption for filaments.

TABLE 1

| Filament | Lamp voltage (V) | Lamp current (A) | Lamp consumption power (W) | Maximum temperature (°C.) | W/°C. | Reflector |
|---|---|---|---|---|---|---|
| Spiral carbon strip | 220 | 8.3 | 1,826 | 96 | 19.0 | No |
| Bar-shaped carbon strip 1 | 110 | 16.0 | 1,760 | 93 | 18.9 | No |
| Bar-shaped carbon strip 2 | 110 | 12.9 | 1,419 | 78 | 18.2 | No |
| Thin graphite plate 1 | 47 | 19.6 | 921.2 | 62 | 14.9 | No |
| Thin graphite plate 2 | 47 | 19.6 | 921.2 | 82 | 11.2 | Yes |

* The maximum temperature is a temperature at a point of a radiation distance 130 mm.
* W/° C. is power consumed to raise a surface temperature of a structure to be tested to 1° C.

From the above table, it can be seen that the case where the filament of the present invention is used has much less power consumption than the case where a conventional filament is used. That is, it can be seen that power consumption when the filament of the present invention is used is 921.2 W, which is only about 50% as compared with 1,826 W when the conventional spiral carbon strip filament is used.

Furthermore, it can be seen that when the thin graphite plate filament of the present invention is used, power consumption used to raise the surface temperature of the structure to 1° C. is 14.9 W, which is only 78% as compared with 19.0 W when the conventional spiral carbon strip filament is used.

In particular, it can be seen that when the filament of the present invention is used and the reflector is installed, power consumption is 11.2 W, which is only 59% as compared with 19.0 W when the conventional spiral carbon strip filament is used.

The filament of the present invention and the infrared lamp using the same have a uniform radiation of infrared rays, a high radiation efficiency, a high heatproof property and durability, low power consumption, easy manufacture, and high productivity. Accordingly, the filament of the present invention and the infrared lamp using the same can be widely used in heating apparatuses, such as a dry chamber for industry.

As described above, the filament of the present invention and the infrared lamp using the same are advantageous in that they have a uniform radiation of infrared rays, a high radiation efficiency, a high heatproof property and durability, low power consumption, easy manufacture, and high productivity.

Furthermore, the filament of the present invention is advantageous in that a relatively long filament and an infrared lamp using the same can be fabricated even without using a middle medium because the filament has a high heatproof property, high strength, and easy manufacture.

Furthermore, in accordance with the present invention, the centering coil is used, and thus the filament is prevented from sagging downwardly or from adhering to the inner wall of the quartz tube even though thermal expansion occurs when light is emitted. Accordingly, there is an advantage in that the filament can be fixed to the quartz tube without being deviated therefrom even though impact is given to the quartz tube.

Furthermore, the present invention is advantageous in that the external lead wires can be drawn out horizontally and vertically according to circumstances by modifying the structure of the insulator.

Furthermore, in accordance with the present invention, upwardly radiated infrared rays can be downwardly reflected by the reflector formed on the surface of the quartz tube. Accordingly, the present invention is advantageous in that the radiation efficiency of infrared rays can be increased.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of fabricating a filament for an infrared lamp, the method comprising:
   cutting a thin graphite plate into a thin graphite plate strip of a predetermined size;
   integrally adhering two sheets of the thin graphite plate strips using heat;
   primarily heating and plasticizing the integrally adhered graphite plate strips within an inert gas;
   coating a silicon-series coating solution on the primarily heated and plasticized graphite plate strips and naturally drying the graphite plate strips; and
   heating and plasticizing the naturally dried graphite plate strips using an identical process to the primary plasticity process and then naturally cooling the heated and plasticized graphite plate strips.

2. A filament for an infrared lamp fabricated using a method according to claim 1.

3. An infrared lamp using a filament according to claim 2.

4. The infrared lamp according to claim 3, wherein a centering coil for fixing the filament is installed within a quartz tube functioning to protect the filament.

5. The infrared lamp according to claim 3, wherein gaskets and fixed clips are installed both ends of the filament.

6. The infrared lamp according to claim 3, wherein a spring is installed at an end of the filament.

7. The infrared lamp according to claim 6, wherein the spring is a coil spring.

8. The infrared lamp according to claim 6, wherein the spring is a laminated spring.

9. The infrared lamp according to claim 3, wherein:
insulators for insulating are installed in respective pinch units of a quartz tube functioning to protect the filament, and
a tap unit of each of the insulators is opened in horizontal and vertical directions.

10. The infrared lamp according to claim 3, wherein a reflector is installed on some of a surface of a quartz tube functioning to protect the filament.

* * * * *